United States Patent
Curtis

(10) Patent No.: US 10,110,019 B2
(45) Date of Patent: Oct. 23, 2018

(54) BATTERY WITH COMMUNICATION INTERFACE

(71) Applicant: Microchip Technology Incorporated, Chandler, AZ (US)

(72) Inventor: Keith Curtis, Gilbert (AZ)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 129 days.

(21) Appl. No.: 15/002,123

(22) Filed: Jan. 20, 2016

(65) Prior Publication Data

US 2016/0218523 A1  Jul. 28, 2016

Related U.S. Application Data

(60) Provisional application No. 62/106,566, filed on Jan. 22, 2015.

(51) Int. Cl.
*H04B 1/52* (2015.01)
*H02J 7/00* (2006.01)
(Continued)

(52) U.S. Cl.
CPC ............ *H02J 7/0013* (2013.01); *G06F 1/263* (2013.01); *G06F 21/44* (2013.01); *G06F 21/81* (2013.01);
(Continued)

(58) Field of Classification Search
CPC ........... H02J 7/0013; H04B 1/52; G06F 1/263
(Continued)

(56) References Cited

U.S. PATENT DOCUMENTS 7,723,952 B2 * 5/2010 Phillips .................... B25F 5/00
307/150
7,808,205 B2 * 10/2010 Rao ....................... H02J 7/0004
320/106

(Continued)

FOREIGN PATENT DOCUMENTS

| DE | 102012203456 A1 | 9/2013 | ............ H01M 10/48 |
| EP | 1892791 A1 | 2/2008 | ............ H01M 10/42 |
| KR | 20070091762 A | 9/2007 | .............. B60L 11/18 |

OTHER PUBLICATIONS

International Search Report and Written Opinion, Application No. PCT/US2016/014226, 15 pages, dated Jun. 16, 2016.
(Continued)

*Primary Examiner* — Samuel Berhanu
*Assistant Examiner* — Tessema Kebede
(74) *Attorney, Agent, or Firm* — Slayden Grubert Beard PLLC

(57) ABSTRACT

A standard two terminal battery package is configured to communicate with an external charger or load, without requiring modification to the battery mechanics and/or high current circuit components integral with the battery. A transmitter and receiver (transceiver) are incorporated into the battery housing. An associated battery charger and/or load, e.g., tool, appliance, vacuum, etc., has a corresponding transceiver configured to communicate with the battery transceiver. A microcontroller may be coupled to the transceiver. Serial number verification between the battery and tool load can be verified. Sensors for temperature, voltage, pressure and pH may be coupled between the battery and microcontroller for monitoring battery temperature, voltage charge and condition during operation or charging thereof. Information from these sensors and more may be communicated from the battery to the load or battery charger.

(Continued)

Furthermore, the battery charger may communicate over the Internet for battery operational history collection and theft identification.

35 Claims, 3 Drawing Sheets

(51) Int. Cl.
| | |
|---|---|
| *H01M 10/42* | (2006.01) |
| *G06F 1/26* | (2006.01) |
| *G06F 21/81* | (2013.01) |
| *G06F 21/85* | (2013.01) |
| *G06F 21/44* | (2013.01) |
| *G06F 13/38* | (2006.01) |
| *H01M 2/30* | (2006.01) |
| *H01M 10/48* | (2006.01) |

(52) U.S. Cl.
CPC ........ *G06F 21/85* (2013.01); *H01M 10/4257* (2013.01); *H02J 7/0004* (2013.01); *H04B 1/52* (2013.01); *G06F 13/38* (2013.01); *H01M 2/30* (2013.01); *H01M 10/48* (2013.01); *H01M 2010/4278* (2013.01); *H02J 7/00* (2013.01)

(58) Field of Classification Search
USPC ........................................................ 320/112
See application file for complete search history.

(56) References Cited

U.S. PATENT DOCUMENTS

| | | | | |
|---|---|---|---|---|
| 8,148,939 | B2* | 4/2012 | Kitagawa | H01M 10/46 320/112 |
| 8,410,637 | B2* | 4/2013 | Karaoguz | G06K 7/10207 307/104 |
| 8,995,912 | B2* | 3/2015 | Rofougaran | H01L 25/00 333/109 |
| 2005/0215204 | A1* | 9/2005 | Wallace | H04B 1/1036 455/78 |
| 2006/0119317 | A1* | 6/2006 | Kogan | G06F 1/1613 320/112 |
| 2007/0126393 | A1* | 6/2007 | Bersenev | H02J 7/0044 320/107 |
| 2009/0039833 | A1* | 2/2009 | Kitagawa | H01M 10/46 320/134 |
| 2013/0241468 | A1* | 9/2013 | Moshfeghi | H02J 7/025 320/107 |
| 2015/0022185 | A1* | 1/2015 | Sako | H02J 7/00 324/133 |
| 2015/0044969 | A1 | 2/2015 | Tucker | 455/41.2 |

OTHER PUBLICATIONS

"MCP2035: Analog Front-End Device for BodyCom Applications," Microchip Technology Incorporated, 68 pages, May 2, 2012.
Partial International Search Report, Application No. PCT/US2016/014226, 5 pages, dated Apr. 4, 2016.

* cited by examiner

BATTERY WITH COMMUNICATION INTERFACE

RELATED PATENT APPLICATION

This application claims priority to commonly owned U.S. Provisional Patent Application No. 62/106,566; filed Jan. 22, 2015; which is hereby incorporated by reference herein for all purposes.

TECHNICAL FIELD

The present disclosure relates to batteries, and, in particular, to smart batteries configured with a communication interface.

BACKGROUND

Smart batteries may be provided with at least one extra terminal (contact) for a communication interface that may be used to communicate, for example, with a digital processor that stores battery information used to adjust charging parameters for that battery. However, not all battery powered applications allow adding an additional terminal to the battery because such an additional terminal(s) is not always possible given a desired mechanical configuration for the battery. Currently available solutions are all direct current (DC) based, using changes in the battery voltage and/or battery load to transmit data to an external receiving device. To modulate the impedance of the battery requires a high current device in series with the battery and may possibly interfere with battery charging operations. Adding an additional terminal to the battery requires modification to the battery mechanics and requires modification to the battery holder mechanics which is undesirable.

SUMMARY

Therefore a need exists for a battery having a standard package configuration that can communicate with an external to the battery device without requiring modification to the battery mechanics and/or high current circuit components integral with the battery.

According to an embodiment, a battery may comprise: a battery housing with an electrical connection consisting of a first positive direct current (DC) terminal and a first negative DC terminal, and may further comprise therein: at least one battery cell coupled between the first positive and negative DC terminals; a first receiver; a first transmitter; and a first digital processor and memory, the first digital processor may be coupled to the first receiver and the first transmitter.

According to another embodiment, an apparatus having data communications between a battery and a device may comprise: a battery having a battery housing with an electrical connection consisting of a first positive direct current (DC) terminal and a first negative DC terminal, and may further comprise therein: at least one battery cell coupled between the first positive and negative DC terminals; a first receiver coupled to the first positive DC terminal; a first transmitter coupled to the first positive DC terminal; and a first digital processor and memory, the first digital processor may be coupled to the first receiver and the first transmitter, wherein the first receiver may be adapted to receive data signals at a first frequency and the first transmitter may be a first digital signal modulator (DSM) adapted to transmit data signals at a second frequency; and a battery operated device having second positive and negative DC terminals adapted for coupling to the first positive and negative DC terminals and may further comprise therein: a DC load coupled between the second positive and negative DC terminals; a second receiver coupled to the second positive DC terminal and adapted to receive data signals at the second frequency; a second digital signal modulator (DSM) coupled to the second positive DC terminal and adapted to transmit data signals at the first frequency; and a second digital processor and memory, the second digital processor may be coupled to the second receiver and the second DSM; wherein the battery housing and the battery operated device may have data communications therebetween.

According to a further embodiment, the first and second frequencies may be the same and the data communications may be simplex. According to a further embodiment, a first bandpass filter may be coupled between the first positive DC terminal and the first receiver, wherein the first bandpass filter may be tuned to the first frequency; and a second bandpass filter may be coupled between the second positive DC terminal and the second receiver, wherein the second bandpass filter may be tuned to the second frequency; wherein the first and second frequencies may be different and the data communications may be duplex.

According to a further embodiment, a first radio frequency (RF) coupler may be coupled between the first positive DC terminal and the at least one battery cell, wherein the first receiver and the first DSM may be coupled to the first RF coupler; and a second RF coupler coupled between the second positive DC terminal and the DC load, wherein the second receiver and the second DSM may be coupled to the second RF coupler.

According to a further embodiment, the first and second RF couplers may be inductive couplers. According to a further embodiment, the first and second RF couplers may be capacitive couplers. According to a further embodiment, a first RF switch may be coupled between the first positive DC terminal and the at least one battery cell, wherein the first receiver and the first DSM may be coupled to the first RF switch; and a second RF switch coupled between the second positive DC terminal and the DC load, wherein the second receiver and the second DSM may be coupled to the second RF switch. According to a further embodiment, a first DC power switch may be coupled between the at least one battery cell and the first positive DC terminal, wherein the first DC power switch may be coupled to and controlled by the first digital processor. According to a further embodiment, a second DC power switch may be coupled between the DC load and the second positive DC terminal, wherein the second DC power switch may be coupled to and controlled by the second digital processor. According to a further embodiment, at least one sensor may be coupled to the at least one battery cell and the first digital processor. According to a further embodiment, the at least one sensor may be selected from the group consisting of a voltage sensor, a temperature sensor, a pressure sensor, and a pH sensor.

According to a further embodiment, a data port may be coupled to the second digital processor. According to a further embodiment, the first digital processor and memory may store identification and operating/charging parameters for the at least one battery cell. According to a further embodiment, the battery operated device may be a battery charger. According to a further embodiment, the battery operated device may be a battery powered tool. According to a further embodiment, the battery operated device may be a battery powered appliance. According to a further embodiment, the identification of the at least one battery cell may have to match identification of the battery operated device or else the battery operated device may not work. According to a further embodiment, the identification and operating/charging parameters for the at least one battery cell may have to match identification of the battery operated device or else the at least one battery cell may not charge.

According to a further embodiment, the operating/charging parameters for the at least one battery cell may be communicated to the second digital processor and the DC load may be a battery charger coupled to the second digital processor and second positive terminal, whereby the second digital processor may control charging parameters of the battery charger while charging the at least one battery cell. According to a further embodiment, the second digital processor may provide estimated charging time determined from the communicated digital data from the first digital processor.

According to a further embodiment, a first microcontroller may comprise the first receiver, DSM, and digital processor and memory; and a second microcontroller may comprise the second receiver, DSM, and digital processor and memory. According to a further embodiment, the battery may be a plurality of batteries. According to a further embodiment, the plurality of batteries may be connected in series, parallel, and/or series parallel.

According to another embodiment, an apparatus having data communications between a battery and a device may comprise: a battery having a battery housing with an electrical connection consisting of a first positive direct current (DC) terminal and a first negative DC terminal, and may further comprise therein: at least one battery cell coupled between the first positive and negative DC terminals; a first receiver and a first transmitter may be formed by a first optical transceiver in the battery housing; a first digital processor and memory, the first digital processor may be coupled to the first receiver and the first transmitter, and a battery operated device having second positive and negative DC terminals and further comprising therein: a DC load coupled between the second positive and negative DC terminals, a second digital processor and memory, and a second optical transceiver in the battery operated device and coupled to the second digital processor; wherein the first and second optical transceivers couple data therebetween.

According to yet another embodiment, an apparatus having data communications between a battery and a device may comprise: a battery having a battery housing with an electrical connection consisting of a first positive direct current (DC) terminal and a first negative DC terminal, and may further comprise therein: at least one battery cell coupled between the first positive and negative DC terminals; a first receiver and a first transmitter may be formed by a first ultrasonic transceiver in the battery housing a first digital processor and memory, the first digital processor may be coupled to the first receiver and the first transmitter, and a battery operated device having second positive and negative DC terminals and further comprising therein: a DC load coupled between the second positive and negative DC terminals, a second digital processor and memory, and a second ultrasonic transceiver in the battery operated device and coupled to the second digital processor; wherein the first and second ultrasonic transceivers couple data therebetween.

According to still another embodiment, an apparatus having data communications between a battery and a device may comprise: a battery having a battery housing with an electrical connection consisting of a first positive direct current (DC) terminal and a first negative DC terminal, and may further comprise therein: at least one battery cell coupled between the first positive and negative DC terminals; a first receiver may be adapted to receive data signals at a first frequency; a first transmitter may be a first digital signal modulator (DSM) and may be adapted to transmit data signals at a second frequency; a first antenna, the first antenna may be coupled to the first receiver and the first DSM; a first digital processor and memory, the first digital processor may be coupled to the first receiver and the first DSM; and a battery operated device having second positive and negative DC terminals and further comprising therein: a DC load coupled between the second positive and negative DC terminals; a second antenna; a second receiver coupled to the second antenna and adapted to receive data signals at the second frequency; a second digital signal modulator (DSM) coupled to the second antenna and adapted to transmit data signals at the first frequency; and a second digital processor and memory, the second digital processor may be coupled to the second receiver and the second DSM; wherein the battery housing and battery operated device may have data communications therebetween. According to a further embodiment, the first and second frequencies are substantially the same frequency. According to a further embodiment, the data communications may be over a Bluetooth communications link.

According to another embodiment, an apparatus having data communications between a battery and a device may comprise: a battery having a battery housing with an electrical connection consisting of a first positive direct current (DC) terminal and a first negative DC terminal, and may further comprise therein: at least one battery cell coupled between the first positive and negative DC terminals; a first receiver may be adapted to receive data signals at a first frequency; a first transmitter may be a first digital signal modulator (DSM) and may be adapted to transmit data signals at a second frequency; a first capacitive coupling plate, the first capacitive coupling plate may be coupled to the first receiver and the first DSM; a first digital processor and memory, the first digital processor may be coupled to the first receiver and the first DSM; and a battery operated device having second positive and negative DC terminals and further comprising therein: a DC load coupled between the second positive and negative DC terminals; a second capacitive coupling plate; a second receiver coupled to the second capacitive coupling plate and adapted to receive data signals at the second frequency; a second digital signal modulator (DSM) coupled to the second capacitive coupling plate and adapted to transmit data signals at the first frequency; and a second digital processor and memory, the second digital processor may be coupled to the second receiver and the second DSM; wherein the battery housing and battery operated device may have data communications therebetween. According to a further embodiment, the first and second frequencies are substantially the same frequency.

BRIEF DESCRIPTION OF THE DRAWINGS

A more complete understanding of the present disclosure may be acquired by referring to the following description taken in conjunction with the accompanying drawings wherein.

Figure 1:
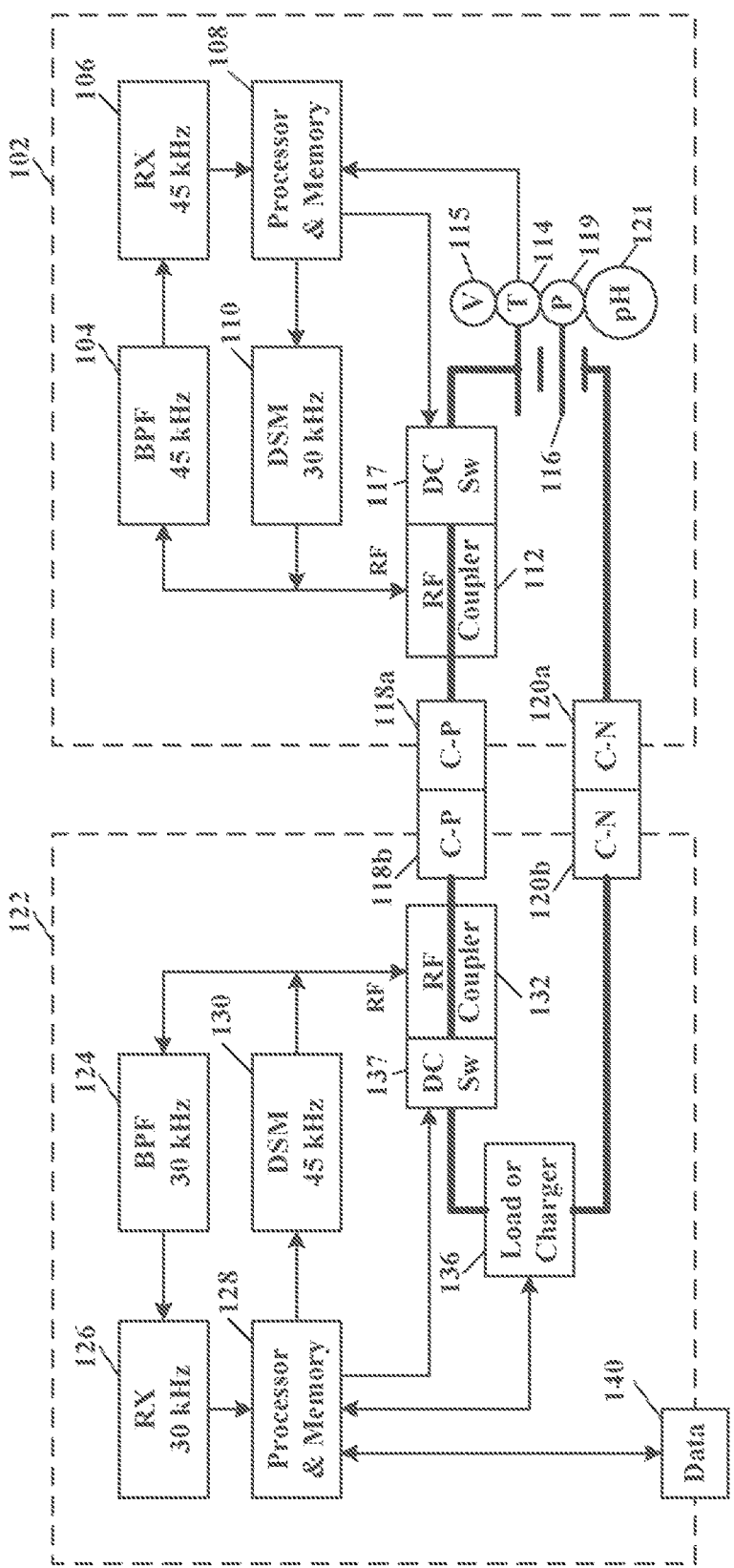
FIG. 1 illustrates a schematic block diagram of a two terminal battery having a duplex communications system, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

A standard two terminal battery may be configured to communicate with an external to the battery device, e.g., charger or load, without requiring modification to the battery mechanics and/or high current circuit components integral with the battery. According to various embodiments of this disclosure, a communications transmitter and receiver (transceiver) may be incorporated into the battery housing, and an associated battery charger and/or load, e.g., tool, appliance, vacuum cleaner, weed eater, drill, etc., has a corresponding transceiver configured to communicate with the battery transceiver. A microcontroller may be provided in the battery and coupled to the receiver and transmitter. In addition, temperature, voltage, gas, pH sensors, etc., may be coupled between the battery and microcontroller for monitoring battery temperature, voltage charge and condition during operation or charging thereof. Information from these sensors and more may be communicated from the battery to the load or battery charger. Verification of battery use with the load or charger may also be provided, and lockout of battery with unauthorized loads or chargers.

Referring now to the drawings, the details of example embodiments are schematically illustrated. Like elements in the drawings will be represented by like numbers, and similar elements will be represented by like numbers with a different lower case letter suffix.

Referring to FIG. 1, depicted is a schematic block diagram of a two terminal battery having a duplex communications system, according to a specific example embodiment of this disclosure. A battery 102 having a housing with an electrical connection consisting of a positive DC power terminal 118a and a negative DC power terminal 120a; and may further comprise a radio frequency (RF) coupler 112, a DC power switch 117, battery cells 116, a bandpass filter (BPF) 104, a receiver 106, a digital signal modulator (DSM) 110, and a digital processor and memory 108. The digital processor and memory 108 may be part of a microcontroller that may be capable of other functions, e.g., memory data storage, volatile and non-volatile; communications, battery voltage output control, etc. Various sensors may also be included in the battery 102, for example but are not limited to, a battery cell temperature sensor 114, a battery cell voltage sensor 115, a battery cell gas pressure sensor 119, and a pH sensor 121 for measuring battery acidity. The DC power switch 117 may be controlled by the digital processor 108. As used herein, "terminal" includes electrical contacts, connections, posts, etc.

An associated battery operated device 122 having a mating battery holder (not shown) with an electrical connection consisting of a positive DC terminal 118b and a negative DC terminal 120b; and may further comprise a radio frequency (RF) coupler 132, a load or battery charger 136, a bandpass filter (BPF) 134, a DC power switch 137, a receiver 126, a digital signal modulator (DSM) 130, and a digital processor and memory 128. The digital processor and memory 128 may be part of a microcontroller that may be capable of other functions, e.g., memory, volatile and non-volatile; communications, etc. The DC power switch 137 may be controlled by the digital processor 128. A data communications port 140 may also be provided, e.g., in a charger 136 configuration, for coupling to a computer (not shown), e.g., USB port; Ethernet or Internet, e.g., RJ45 port; wireless Ethernet, e.g., Wi-Fi; etc. The battery operated device 122 may be configured with standard DC+(118b) and DC- (120b) terminals that are adapted to mate with the battery 102 terminals 118a and 120a, respectively. No other electrical connections between the battery 102 and the battery operated device 122 are required nor desired. The term "battery operated device 122" may comprise a battery charging system, a battery operated appliance, a battery operated power tool, a battery operated industrial or medical device, a battery operated communications device, and the like. It is contemplated and with the scope of this disclosure that the battery operated device 122 may be coupled to one or more batteries 102, e.g., a plurality of batteries 102 connected in series and or parallel.

Figure 3:
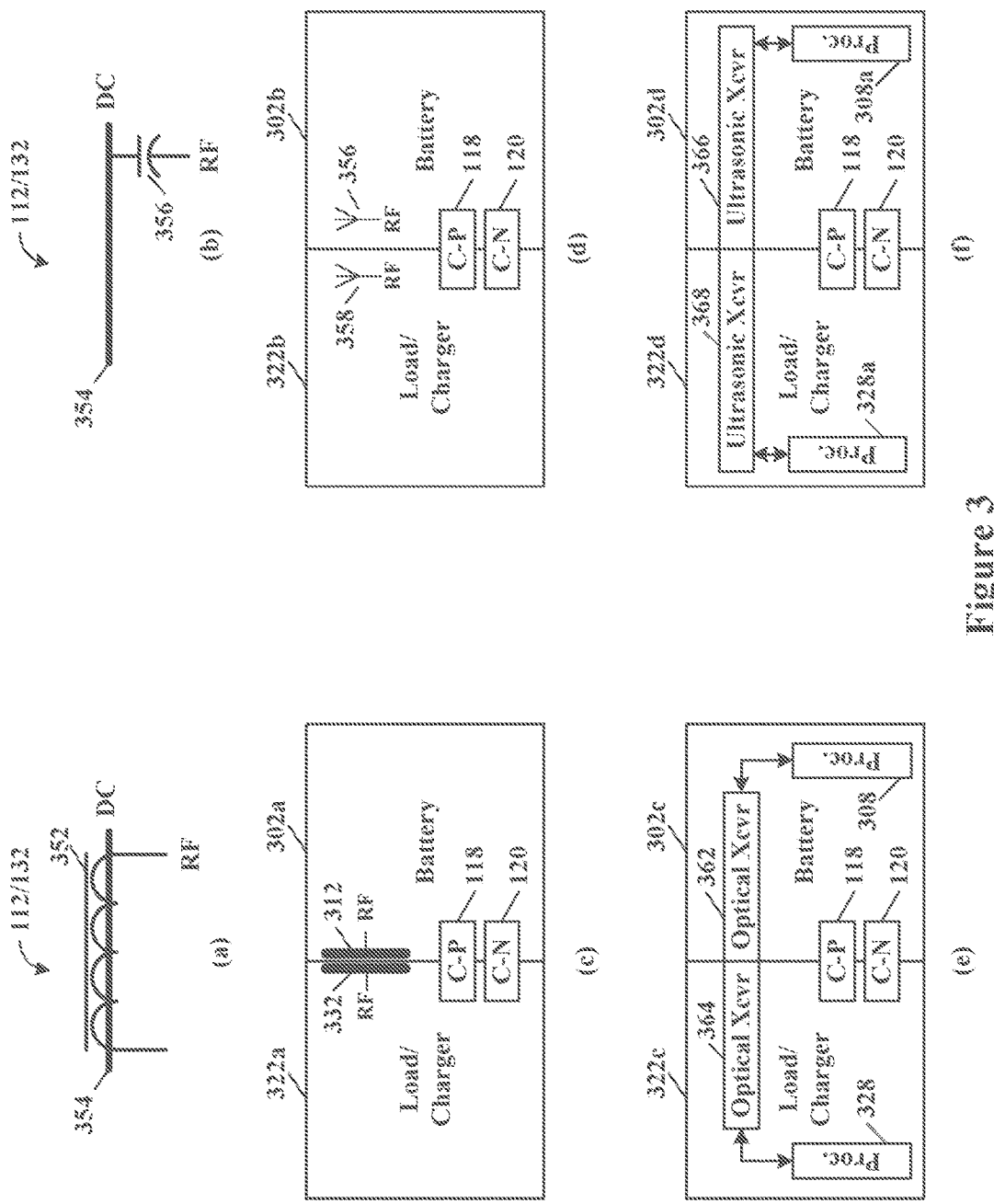
FIG. 3 illustrates schematic block diagrams of various communications interfaces for the battery communications systems shown in FIGS. 1 and 2.

RF couplers 112 and 132 may be used to couple low frequency RF signals between the positive terminals 118a and 118b using the same mechanical and electrical arrangements for both the battery 102 and the battery operated device 122. This allows for bi-directional communications. Memory associated with the processor 108 allows for storage of battery capacity, number of previous charge and discharge cycles, manufacture, type and serial number of the battery 102, and other information associated with the battery cells 116. Memory associated with the processor 128 allows storage of battery cell charging profiles, charging allowed based upon proper battery identification, type and serial number of all the batteries 102 authorized to be charged and/or used by the battery operated device 122, and other information associated with the load or charger 136. Various embodiments for coupling data transmissions between the battery 102 and the battery holder 122 are shown in FIG. 3 and more fully discussed hereinafter.

For full duplex communications operation between the battery 102 and battery operated device 122, two frequencies may be used with appropriate bandpass frequency filtering on the received signals. As an example but not a limitation, the battery 102 receive carrier frequency may be 45 kHz and the transmit carrier frequency may be 30 kHz. The battery operated device 122 would use the opposite receive and transmit frequencies, a receive carrier frequency of 30 kHz and a transmit carrier frequency of 45 kHz. The bandpass filters (BPF) 104 and 124 allow for full duplex (simultaneous receive and transmit) operation. The DSM 110 may be coupled with a buffer or amplifier stage (not shown) through a capacitor (not shown) with the positive terminal 118a of the battery 102. The DSM 130 may be coupled with a buffer or amplifier stage (not shown) through a capacitor (not shown) with the positive terminal 118b of the battery operated device 122.

Transmission of the 30 kHz carrier frequency modulated signal may be coupled to the positive terminal 118a of the battery 102 through the RF coupler 112, and received at the positive terminal 118b, through the RF coupler 132 and BPF 124 of the battery operated device 122. Transmission of the 45 kHz carrier frequency modulated signal may be coupled to the positive terminal 118b of the battery operated device 122 through the RF coupler 132, and received at the positive terminal 118a, through the RF coupler 112 and BPF 104 of the battery 102. This configuration allows bidirectional data communications for monitoring and authentication purposes. The receivers 106 and 126 may be, for example but are not limited to, a MCP2035 analog front end, manufactured by the Assignee of the present application. However, any other suitable analog front end (AFE) may be used and is contemplated herein. Documentation of the MCP2035 may be obtained at www.microchip.com, and is hereby incorporated by reference herein for all purposes. This analog front end demodulates the signal and recovers the data. The AFE MCP2035 may be used as the receiver 106/126 and the digital signal modulator (DSM) 110/130 may be used as the transmitter. Any data modulation type may be used and is contemplated herein, wherein the carrier frequency data modulation/demodulation may be, for example but is not limited to, amplitude shift keying (ASK), pulse position modulation (PPM), frequency shift keying (FSK), or on-off keying (OOK).

Figure 2:
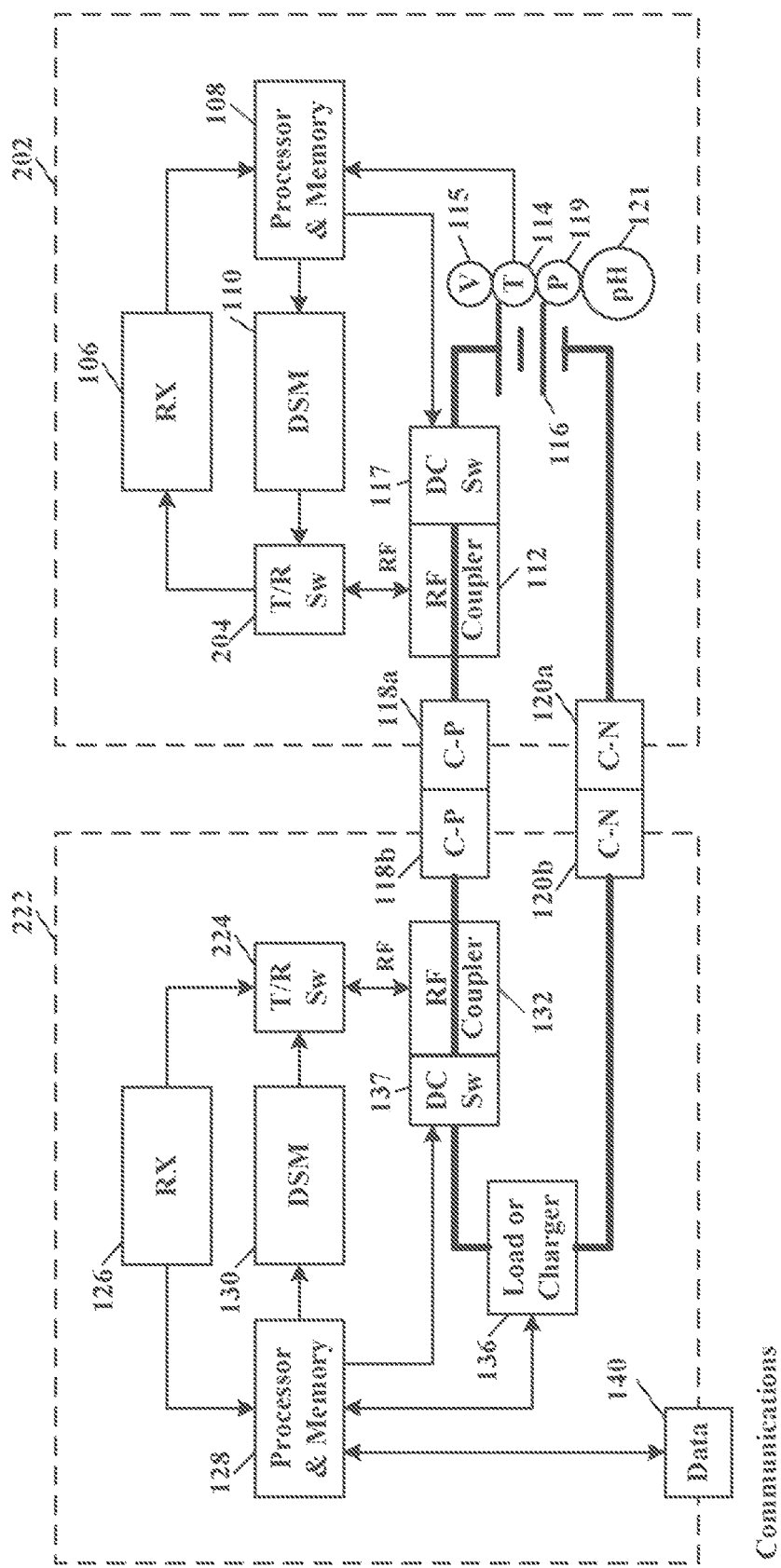
FIG. 2 illustrates a schematic block diagram of a two terminal battery having a simplex communications system, according to another specific example embodiment of this disclosure.

Referring to FIG. 2, depicted is a schematic block diagram of a two terminal battery having a simplex communications system, according to another specific example embodiment of this disclosure. A battery 202 having a housing with an electrical connection consisting of a positive DC power terminal 118b and a negative DC power terminal 120b; and may further comprise, a radio frequency (RF) coupler 112, a transmit/receive (T/R) switch 204, a DC power switch 117, battery cells 116, a receiver 106, a digital signal modulator (DSM) 110, and a digital processor and memory 108. The digital processor and memory 108 may be part of a microcontroller that may be capable of other functions, e.g., memory, volatile and non-volatile; communications, battery voltage output control, etc. Various sensors may also be included in the battery 202, for example but not limited to, a battery cell temperature sensor 114, a battery cell voltage sensor 115, a battery cell gas pressure sensor 119 and a pH sensor 121 for measuring battery acidity. The DC power switch 117 may be controlled by the digital processor 108. As used herein, "terminal" includes electrical contacts, connections, posts, etc.

An associated battery operated device 222 having a mating battery holder (not shown) with an electrical connection consisting of a positive DC terminal 118b and a negative DC terminal 120b; and may further comprise a radio frequency (RF) coupler 132, a load or battery charger 136, a transmit/receive (T/R) switch 224, a DC power switch 137, a receiver 126, a digital signal modulator (DSM) 130, and a digital processor 128. The digital processor and memory 128 may be part of a microcontroller that may be capable of other functions, e.g., memory, volatile and non-volatile; communications, etc. The DC power switch 137 may be controlled by the digital processor 128. A data communications port 140 may also be provided, e.g., in a charger 136 configuration, for coupling to a computer (not shown), e.g., USB port; Ethernet or Internet, e.g., RJ45 port; wireless Ethernet, e.g., Wi-Fi; etc. The battery operated device 222 may be configured with standard DC+ and DC− mating terminals for the battery 202. No other connections between the battery 202 and the battery operated device 222 are required nor desired. The term "battery operated device 222" may comprise a battery charging system, a battery operated appliance, a battery operated power tool, a battery operated industrial or medical device, a battery operated communications device, and the like. It is contemplated and with the scope of this disclosure that the battery operated device 222 may be coupled to one or more batteries 2202, e.g., a plurality of batteries 202 connected in series and or parallel.

Communications and operation of the battery 202 and battery operated device 222 shown in FIG. 2 is substantially the same as the circuit shown in FIG. 1 above, except that communications is simplex (transmit then receive on the same frequency). This may simplify the RF circuits of the battery 202 and battery operated device 222 by substituting the BPFs 104 and 124 with the (T/R) switches 204 and 224.

A smart battery or battery pack, e.g., a plurality of smart batteries; according to various embodiments disclosed herein, allows for battery charge tracking, battery authentication, battery temperature tracking during charging, battery chemistry determination for appropriate charging, etc. Information stored in the processor memory 108 of the battery 102/202 may be used to determine the battery cell's 116 age by the number of recharges and the depth of discharge in each cycle. Use information from the thermal sensor 119 to cut off charging when the battery cells 116 is either too hot or too cold, wherein trickle charging of the battery cells 116 may be provided to warm them up for full charging if the cells are too cold.

If a battery charger 136 associated with the battery operated device 122/222 is connected to the Internet, e.g., Wi-Fi, then usage information may be sent to the manufacturer to better help right sizing batteries in their products. Information sent to the manufacturer may be used to determine performance parameters based on customer usage. When the battery cells 116 gets close to the end of their life, the manufacturer can send a reminder and coupon for a new battery with a rebate to recycle the battery. If the user is miss using the battery powered tools, then a suggestion and discount coupons can be sent to the user for the right tool for the job.

A company may use the information about battery usage by its employees to establish usage rules for the batteries and use the battery life information as a determining factor. For example, when a battery is new it can be used in high current tools, when not so new it can be used in lower current tools, and when old then only use in low current tools. When the battery is at the end of its life it can be taken out of service and recycled.

Lockout and security for battery usage and charging may be provided by coding the battery 102/202 to the battery operated device 222 so that the battery must be authenticated for use with a charger and tools. For example, if the charger does not recognize the battery then it can refuse to charge it (deactivate DC switch 137). If the battery 102/202 is put into a tool that it does not recognize then it can refuse to supply current to that tool (deactivate DC switch 117). If the battery is put in an unauthorized charger it can refuse to accept charge from that charger (deactivate DC switch 117).

Further features possible with the embodiments disclosed herein: If any unauthorized combination of the battery and a load is attempted, the battery will log in memory the event and transfer the unauthorized event to an authorized charger next time it is being charged, wherein the charger can send the unauthorized event information to the company and/or manufacturer. If the battery is connected to an unauthorized charger coupled to the Internet, the battery information, e.g., serial number, owner, etc., can be sent through the charger Internet connection identifying the battery as stolen. An intelligent charger can interrogate the battery as to type, charging algorithm, and remaining charge necessary, wherein optimal charging may be provide to the battery and an estimated charging time thereof.

The AFE receiver 106/126 and/or the DSM 110/130 may be peripherals of a microcontroller integrated circuit (IC). Thus, only a single IC may be required in the battery 102/202 or battery operated device 122/222. Such a microcontroller may also comprise an integrated temperature sensor and may further comprise a secure memory for storing authentication data for the battery and charger operation as described hereinabove. An external device may be linked to the battery operated device 122/222 using authentication methods requiring a public key and an access key to unlock the coupled battery operated device 122/222. Thus, a battery 102/202 may only work, for example, for a designated tool. A user could not take the battery 102/202 to a different location and operate another device (load 136) with it. This also may prevent third parties from providing clone batteries at substantially less cost. Furthermore, the memory within the microcontroller may be used to track battery related data such as the number of charging cycles, charging curves, current and/or monitoring usage, etc. The microcontroller itself could also control charging or at least certain aspects of the charging by using for example termination and protection algorithms that monitor the state of the battery during a charging process.

Referring to FIG. 3, depicted is schematic block diagrams of various communications interfaces for the battery communications systems shown in FIGS. 1 and 2. FIG. 3(a) shows inductively coupling the RF signal with an inductor 352 to the battery bus 354 connected to the positive terminal 118. The battery bus 354 connects the positive terminal 118 with the actual positive terminal of the battery cells 116. This can be accomplished by an actual inductor coil (current transformer configuration), a ferrite bead or an inductive lead. The inductor 352 may be used to allow a high frequency signal to be superimposed on the battery bus 354 coupled the positive terminal 118, according to one embodiment. However, depending on the design, an inductance may not be necessary or the parasitic inductance of the battery design and/or connection (battery bus 354) to the positive terminal 118 may be sufficient. FIG. 3(b) shows capacitively coupling the RF signal to the battery bus 354 connected to the positive terminal 118 with a capacitor 356.

As shown in FIG. 3(c), the RF couplers 112 and 132 may be eliminated and replaced with capacitive coupling between the battery housing 302a and the battery operated device 322a by providing capacitive plates 312 and 332 proximate to each other when the battery housing 302a and device 322a are operating together. BodyCom communications may be used with these capacitive plates 312 and 332 as more fully described in commonly owned US Patent Application Publication US 2015/0044969 A1, published Feb. 12, 2015, entitled "Wireless Transmission System and Method" by Chris Tucker, and is hereby incorporated by reference herein for all purposes.

Wireless transmissions at any band or frequency, e.g., Bluetooth, may be used by coupling the receiver 106/126 and DSM 110/130 to internal antennas 356 and 358, as shown in FIG. 3(d). FIG. 3(e) shows optical transceivers 362 and 364 in the battery 302c and the battery operated device 322c that communicate optically through optical windows located in coterminous portions of the battery 302c and battery operated device 322c. FIG. 3(f) shows ultrasonic (acoustic) transceivers 366 and 368 in the battery 302d and the battery operated device 322d that communicate acoustically through coterminous portions of the battery 302c and battery operated device 322c.

The invention claimed is:

1. A battery, comprising:
   a battery housing with an electrical connection consisting of a first positive direct current (DC) terminal and a first negative DC terminal, and further comprising therein:
   at least one battery cell coupled through respective connections with the first positive and negative DC terminals, respectively;
   a first receiver having an input and an output;
   a first transmitter having an input and an output;
   a first digital processor and memory, the first digital processor is coupled to the output of the first receiver and to the input of the first transmitter,
   a first RF coupler coupled with the input of the first receiver and the output of the first transmitter, wherein the first receiver is an RF receiver and the first transmitter is an RF transmitter, and wherein the first RF coupler is arranged adjacent to the electrical connection between the first positive DC terminal and the at least one battery cell such that RF signals are transmitted via the electrical connection.

2. Apparatus having data communications between a battery and a device, comprising:
   a battery according to claim 1,
   wherein the first receiver is adapted to receive data signals at a first frequency and the first transmitter is a first digital signal modulator (DSM) adapted to transmit data signals at a second frequency; and
   a battery operated device having second positive and negative DC terminals adapted for coupling to the first positive and negative DC terminals and further comprising therein:
   a DC load coupled between the second positive and negative DC terminals;
   a second RF receiver coupled with a second RF coupler which is arranged adjacent an electrical connection between the DC load and the second positive DC terminal such that RF signals are received via the electrical connection and adapted to receive data signals at the second frequency;
   a second digital signal modulator (DSM) coupled to the second RF coupler and adapted to transmit data signals at the first frequency; and
   a second digital processor and memory, the second digital processor is coupled to the second receiver and the second DSM;
   wherein the battery housing and the battery operated device have data communications therebetween.

3. The apparatus according to claim 2, wherein the first and second frequencies are the same and the data communications is simplex.

4. The apparatus according to claim 2, further comprising:
   a first bandpass filter coupled between the first positive DC terminal and the first receiver, wherein the first bandpass filter is tuned to the first frequency; and
   a second bandpass filter coupled between the second positive DC terminal and the second receiver, wherein the second bandpass filter is tuned to the second frequency;
   wherein the first and second frequencies are different and the data communications is duplex.

5. The apparatus according to claim 1, wherein the first RF coupler is an inductive coupler.

6. The apparatus according to claim 2, wherein the first and second RF couplers are inductive couplers.

7. The apparatus according to claim 2, wherein the first and second RF couplers are capacitive couplers.

8. The apparatus according to claim 2, further comprising:
a first RF switch coupled with the first RF coupler, wherein the first receiver and the first DSM are coupled to the first RF switch; and
a second RF switch coupled with the second RF coupler, wherein the second receiver and the second DSM are coupled to the second RF switch.

9. The apparatus according to claim 2, further comprising a first DC power switch coupled between the at least one battery cell and the first positive DC terminal, wherein the first DC power switch is coupled to and controlled by the first digital processor.

10. The apparatus according to claim 2, further comprising a second DC power switch coupled between the DC load and the second positive DC terminal, wherein the second DC power switch is coupled to and controlled by the second digital processor.

11. The apparatus according to claim 2, further comprising at least one sensor coupled to the at least one battery cell and the first digital processor.

12. The apparatus according to claim 11, wherein the at least one sensor is selected from the group consisting of a voltage sensor, a temperature sensor, a pressure sensor, and a pH sensor.

13. The apparatus according to claim 2, further comprising a data port coupled to the second digital processor.

14. The apparatus according to claim 2, wherein the first digital processor and memory stores identification and operating/charging parameters for the at least one battery cell.

15. The apparatus according to claim 2, wherein the battery operated device is a battery charger.

16. The apparatus according to claim 2, wherein the battery operated device is a battery powered tool.

17. The apparatus according to claim 2, wherein the battery operated device is a battery powered appliance.

18. The apparatus according to claim 14, wherein the identification of the at least one battery cell has to match identification of the battery operated device or else the battery operated device will not work.

19. The apparatus according to claim 14, wherein the identification and operating/charging parameters for the at least one battery cell has to match identification of the battery operated device or else the at least one battery cell will not charge.

20. The apparatus according to claim 14, wherein the operating/charging parameters for the at least one battery cell are communicated to the second digital processor and the DC load is a battery charger coupled to the second digital processor and second positive terminal, whereby the second digital processor controls charging parameters of the battery charger while charging the at least one battery cell.

21. The apparatus according to claim 20, wherein the second digital processor provides estimated charging time determined from the communicated digital data from the first digital processor.

22. The apparatus according to claim 2, wherein:
a first microcontroller comprises the first receiver, the first DSM, and the first digital processor and memory; and
a second microcontroller comprises the second receiver, the second DSM, and the second digital processor and memory.

23. The apparatus according to claim 2, wherein the battery is a plurality of batteries.

24. The apparatus according to claim 2, wherein the plurality of batteries are connected in series, parallel, and/or series parallel.

25. The apparatus according to claim 1, wherein the first RF coupler is a capacitive coupler.

26. A battery operated device, comprising:
a positive DC terminal and a negative DC terminal;
a DC load coupled between the second positive and negative DC terminals;
an RF receiver coupled with an RF coupler which is arranged adjacent an electrical connection between the DC load and the positive DC terminal such that RF signals are received via the electrical connection and adapted to receive data signals at a first frequency;
a digital signal modulator (DSM) coupled to the RF coupler and adapted to transmit data signals at a second frequency; and
a digital processor and memory, the digital processor is coupled to the receiver and the DSM;
wherein the battery operated device is configured to have data communications through the positive and negative DC terminals.

27. The battery operated device according to claim 26, wherein the first and second frequencies are the same and the data communications is simplex.

28. The battery operated device according to claim 26, further comprising:
a bandpass filter coupled between the positive DC terminal and the RF receiver, wherein the bandpass filter is tuned to the first frequency;
wherein the first and second frequencies are different and the data communications is duplex.

29. The battery operated device according to claim 26, wherein the RF coupler is an inductive coupler.

30. The battery operated device according to claim 26, wherein the RF coupler is a capacitive coupler.

31. The battery operated device according to claim 26, further comprising:
an RF switch coupled with the RF coupler, wherein the receiver and the DSM are coupled to the RF switch.

32. The battery operated device according to claim 26, further comprising a DC power switch coupled between the DC load and the positive DC terminal, wherein the DC power switch is coupled to and controlled by the digital processor.

33. The battery operated device according to claim 26, further comprising a data port coupled to the digital processor.

34. The battery operated device according to claim 26, wherein the battery operated device is a battery charger.

35. The battery operated device according to claim 26, wherein the battery operated device is a battery powered tool or a battery powered appliance.

* * * * *